K. E. SCHWARZ.
MEANS FOR AIDING IN TEACHING PHONICS AND SPELLING OF WORDS.
APPLICATION FILED AUG. 29, 1917.

1,326,695. Patented Dec. 30, 1919.

Inventor
Katharine E. Schwarz
By G.F. Dunstan
her Attorney

UNITED STATES PATENT OFFICE.

KATHARINE E. SCHWARZ, OF LAKEWOOD, OHIO.

MEANS FOR AIDING IN TEACHING PHONICS AND SPELLING OF WORDS.

1,326,695.  Specification of Letters Patent.  Patented Dec. 30, 1919.

Application filed August 29, 1917. Serial No. 188,746.

*To all whom it may concern:*

Be it known that I, KATHARINE E. SCHWARZ, a citizen of the United States, residing at Lakewood, in the county of Cuyahoga and State of Ohio, have invented certain new and useful Improvements in Means for Aiding in Teaching Phonics and Spelling of Words, of which the following is a specification.

This invention relates to means for aiding in teaching phonics and spelling of words, and has for its main object to provide means whereby a child will be entertained as though playing a game and at the same time aided in learning the correct pronunciation of spelling of words.

The invention consists in providing a card on which is printed a pictorial illustration that is suggestive of the sound of some particular letter to be taught, and also a picture of an object with the name thereof which contains said particular letter pronounced as it is to be taught. Also printed on this card are key words which contain said particular letter, and under said key words are printed single letters or combinations of letters, with which the key words or the beginnings or endings thereof will form the words to be taught. Said key words and the beginnings and endings of the same are printed also on separate cards, which are adapted to be placed by the child upon the first card, serving as a guide, in matching position for making up the completed words. In this manner, the child readily learns the correct pronunciation and spelling of the words.

In order that the invention may be clearly understood, the same will be hereinafter fully described in connection with the accompanying drawings, which simply illustrate the invention, and the novel features thereof will be distinctly pointed out in the appended claims.

Figure 1:
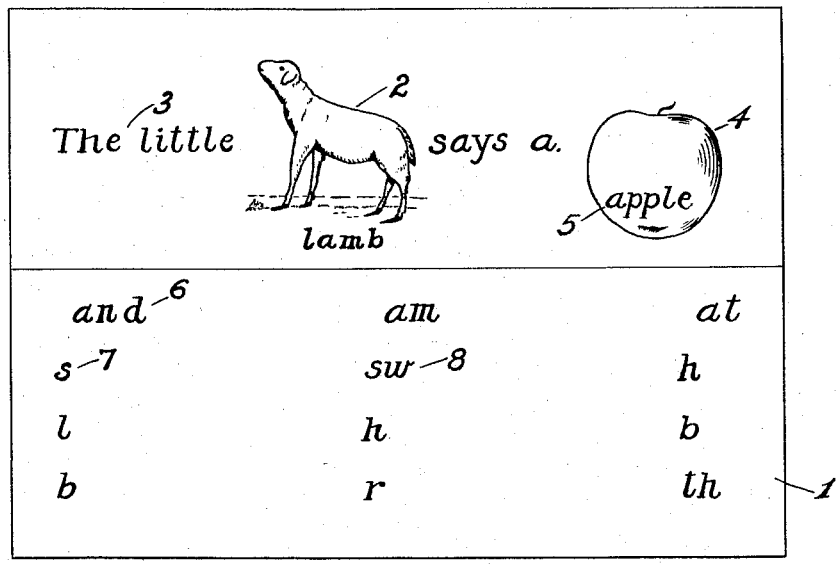
Figure 2:
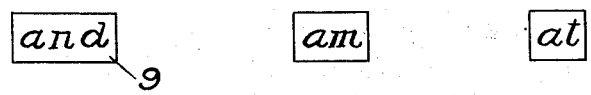
Figure 3:
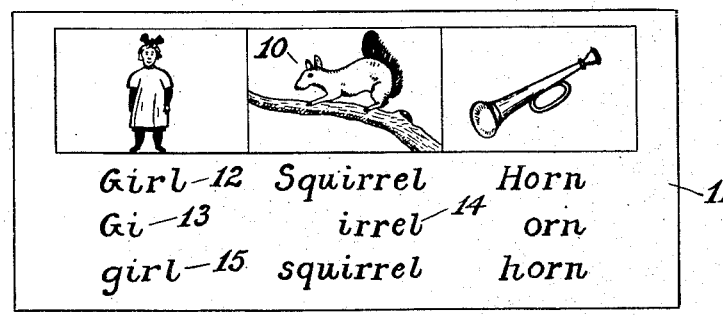

In the drawings, Figure 1 illustrates one of the cards used in teaching the sound of a particular letter and words containing the letter, Fig. 2 represents the separate cards having printed thereon the key or family words for matching the letters or combination of letters on the first card, and Fig. 3 illustrates the card for teaching the spelling of words.

Referring to the drawings, 1 represents a card adapted to be used by a child for learning the sound of the letter "a" having the short sound, as pronounced for instance in the word "apple." To convey to the mind of the child the particular sound of the letter, a picture of a lamb 2 is shown in an appropriate sentence 3. The lamb is represented for the reason that its cry is similar to "a" having the short sound, and is either already known to a child or is easily impressed in this manner upon the child's mind. As an example of how the letter pronounced in said certain way is used in a word, a picture which represents that word is shown as indicated by 4, and the word 5 is also given. In this case, the picture of an apple is shown, for in the word "apple" the "a" has the short sound.

On the card are also printed a plurality of key or family words as indicated at 6, and below these words are printed single letters 7 or combinations of letters 8 of a series, with which said key words will form complete words. The key words 6 are also printed on separate cards 9, which are adapted to be placed by the child upon the card 1 in proper matching position with the letters 7 or 8 to form correct words. In this entertaining manner, the child learns a certain pronunciation of a particular letter and the use of that letter in a series of words.

To carry out the same principle with respect to words in general, or particular groupings of words, objects 10 are illustrated on a card 11, and beneath each object is printed the name of the same as at 12. Parts of the names, either the beginnings 13 or the endings 14, or the name spelled with a small letter instead of a capital as 15, are printed below said names 12. The omitted beginning or ending of said names are printed on separate cards similar to those already mentioned and indicated by 9, and these are to be matched by the child with the parts given to make up the complete names like the example. Although objects representing nouns are shown, it will be readily seen that the same idea may be used with respect to adjectives, verbs and other words, in which cases the illustrations would convey the meaning of the words printed below the same.

From the above, it will be understood that a child will be entertained and aided while learning letters having a particular sound in certain series of words, and at the same time will learn the correct pronunciation and spelling of the words, on account of the pictorial illustrations making an impression upon the mind of the child, and the entertainment afforded the child in placing the little cards in position for completing the words.

Having fully described my invention, what I claim is:

1. In a means for aiding in teaching phonics and spelling of words, a sentence containing a letter, an illustration of a sound producing object adapted to convey the pronunciation of the letter, a key word containing said letter as pronounced, a letter or combination of letters with which the key word will form other words, and cards having printed thereon the key words for matching with said last mentioned letter or combination of letters, substantially as described.

2. In a means for aiding in teaching phonics and spelling of words, a card, a sentence printed on the card, the sentence containing a letter, an illustration of a sound producing object on the card adapted to convey the pronunciation of the letter, a picture representing a word containing said letter as pronounced shown on the card, the word represented by the picture printed on the card, a plurality of key words printed on the card, a plurality of letters or combination of letters with which the key words will form other words, and cards having printed thereon the key words for matching with said last mentioned letters or combinations of letters, substantially as described.

3. In a means for aiding in teaching phonics and spelling of words, a card, a picture representing a word shown on the card, the word represented by the picture being printed on the card, letters or combinations of letters forming a part of said word, and cards having printed thereon letters adapted to be placed in matching position with said letters or combination of letters for completing words, substantially as described.

In testimony whereof I affix my signature.

KATHARINE E. SCHWARZ.